United States Patent
Pham et al.

(10) Patent No.: US 9,562,710 B2
(45) Date of Patent: Feb. 7, 2017

(54) DIAGNOSTICS FOR VARIABLE-CAPACITY COMPRESSOR CONTROL SYSTEMS AND METHODS

(71) Applicant: Emerson Climate Technologies, Inc., Sidney, OH (US)

(72) Inventors: Hung M. Pham, Dayton, OH (US); Edward J. Trudeau, Jr., Covington, OH (US); Sahil Popli, Troy, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 15/138,937

(22) Filed: Apr. 26, 2016

(65) Prior Publication Data

US 2016/0313041 A1 Oct. 27, 2016

Related U.S. Application Data

(60) Provisional application No. 62/153,209, filed on Apr. 27, 2015, provisional application No. 62/309,247, filed on Mar. 16, 2016.

(51) Int. Cl.
F25B 49/02 (2006.01)
F24F 11/00 (2006.01)

(52) U.S. Cl.
CPC ......... F25B 49/022 (2013.01); F24F 11/0012 (2013.01); F24F 11/0015 (2013.01);
(Continued)

(58) Field of Classification Search
CPC ............ F24F 2011/0013; F24F 11/0012; F24F 11/0015; F24F 2011/0016; F24F 2011/0052; F25B 49/022
See application file for complete search history.

(56) References Cited

U.S. PATENT DOCUMENTS

| 5,062,276 A | 11/1991 | Dudley |
| 6,293,116 B1 | 9/2001 | Forrest et al. |

(Continued)

FOREIGN PATENT DOCUMENTS

| CN | 1517624 A | 8/2004 |
| CN | 1873352 A | 12/2006 |

(Continued)

OTHER PUBLICATIONS

International Search Report regarding International Application No. PCT/US2016/029588, dated Aug. 9, 2016.

(Continued)

*Primary Examiner* — Cassey D Bauer
(74) *Attorney, Agent, or Firm* — Harness, Dickey & Pierce, P.L.C.

(57) ABSTRACT

A system includes a variable-capacity compressor operable at a first capacity and at a second capacity that is higher than the first capacity and an outdoor-air-temperature sensor. A control module receives a demand signal from a thermostat and operates the variable-capacity compressor in a first mode when communication with the outdoor-air-temperature sensor has not been interrupted and in a fault mode when communication with the outdoor-air-temperature sensor has been interrupted. In the first mode, the control module switches the variable-capacity compressor between the first capacity and the second capacity based on the demand signal and the outdoor-air-temperature data. In the fault mode, the control module operates the variable-capacity compressor by operating the variable-capacity compressor at at least one of the first capacity and the second capacity based on the demand signal.

32 Claims, 11 Drawing Sheets

(52) U.S. Cl.
CPC .............. *F24F 2011/0013* (2013.01); *F24F 2011/0016* (2013.01); *F24F 2011/0052* (2013.01)

(56) References Cited

U.S. PATENT DOCUMENTS

| | | | |
|---|---|---|---|
| 8,209,073 | B2 | 6/2012 | Wijaya et al. |
| 8,863,536 | B1 | 10/2014 | Perry et al. |
| 2003/0156946 | A1 | 8/2003 | Tolbert |
| 2005/0155369 | A1 | 7/2005 | Ootori et al. |
| 2006/0156749 | A1 | 7/2006 | Lee et al. |
| 2006/0260334 | A1 | 11/2006 | Carey et al. |
| 2006/0280627 | A1 | 12/2006 | Jayanth |
| 2007/0012052 | A1* | 1/2007 | Butler .............. F24F 11/0009 62/181 |
| 2007/0151267 | A1 | 7/2007 | Hatano et al. |
| 2012/0185728 | A1* | 7/2012 | Guo .................. F24F 11/0009 714/26 |
| 2014/0262134 | A1* | 9/2014 | Arensmeier .......... F24F 11/02 165/11.2 |

FOREIGN PATENT DOCUMENTS

| | | |
|---|---|---|
| JP | H03160261 A | 7/1991 |
| JP | H09318140 A | 12/1997 |
| KR | 100715999 B1 | 5/2007 |
| KR | 20070071090 A | 7/2007 |
| KR | 20100059522 A | 6/2010 |
| KR | 20130033847 A | 4/2013 |
| WO | WO-2009061301 A1 | 5/2009 |

OTHER PUBLICATIONS

Written Opinion of the International Searching Authority regarding International Application No. PCT/US2016/029588, dated Aug. 9, 2016.
International Search Report regarding International Application No. PCT/US2016/029593, dated Aug. 10, 2016.
Written Opinion of the International Searcing Authority regarding International Application No. PCT/US2016/029593, dated Aug. 10, 2016.
International Search Report regarding International Application No. PCT/US2016/029543, dated Aug. 9, 2016.
Written Opinion of the International Searching Authority regarding International Application No. PCT/US2016/029543, dated Aug. 9, 2016.
International Search Report regarding International Application No. PCT/US2016/029536, dated Sep. 12, 2016.
Written Opinion of the International Searching Authority regarding International Application No. PCT/US2016/029536, dated Sep. 12, 2016.

* cited by examiner

345

| OAT (°F) | BASELINE T1 | OVERRIDE T1 |
|---|---|---|
| >90 | 5 seconds | If $T2_{n-1}$ >5min, then $T1_n$=5sec, else $T1_n$=40min |
| 85-90 | 30 minutes | If $T2_{n-1}$ >5min, then $T1_n$=5sec, else $T1_n$=40min |
| 80-85 | 35 minutes | Not applicable. See Baseline T1 Column. |
| 75-80 | 40 minutes | Not applicable. See Baseline T1 Column. |
| 70-75 | 50 minutes | Not applicable. See Baseline T1 Column. |
| 65-60 | 60 minutes | Not applicable. See Baseline T1 Column. |
| 60-65 | 60 minutes | Not applicable. See Baseline T1 Column. |
| 55-60 | 50 minutes | Not applicable. See Baseline T1 Column. |
| 50-55 | 40 minutes | Not applicable. See Baseline T1 Column. |
| 45-50 | 40 minutes | Not applicable. See Baseline T1 Column. |
| 40-45 | 30 minutes | If $T2_{n-1}$ >5min, then $T1_n$=5sec, else $T1_n$=20min |
| <40 | 5 seconds | If $T2_{n-1}$ >5min, then $T1_n$=5sec, else $T1_n$=20min |

| OAT (°F) 446 | BASELINE T1 447 | POSITIVE OAT SLOPE 448 | NEGATIVE OAT SLOPE | EXTREME NEGATIVE OAT SLOPE 449 |
|---|---|---|---|---|
| >90 | 30 minutes | If $T2_{n-1}$ > 5min, then $T1_n$ = 5sec, else $T1_n$ = 30min | If $T2_{n-1}$ > 5min, then $T1_n$ = 5sec, else $T1_n$ = 25min | $T1_n$ = 2min |
| 85-90 | 30 minutes | If $T2_{n-1}$ > 5min, then $T1_n$ = 5sec, else $T1_n$ = 50min | If $T2_{n-1}$ > 5min, then $T1_n$ = 5sec, else $T1_n$ = 25min | $T1_n$ = 4min |
| 80-85 | 40 minutes | If $T2_{n-1}$ > 5min, then $T1_n$ = 5sec, else $T1_n$ = 55min | If $T2_{n-1}$ > 5min, then $T1_n$ = 5sec, else $T1_n$ = 30min | $T1_n$ = 8min |
| 75-80 | 40 minutes | If $T2_{n-1}$ > 10min, then $T1_n$ = 5sec, else $T1_n$ = 60min | If $T2_{n-1}$ > 10min, then $T1_n$ = 5sec, else $T1_n$ = 40min | $T1_n$ = 10min |
| 45-75 | 60 minutes | T1 = 60 | T1 = 60 | $T1_n$ = 10min |
| 35-45 | 40 minutes | If $T2_{n-1}$ > 5min, then $T1_n$ = 5sec, else $T1_n$ = 30min | If $T2_{n-1}$ > 5min, then $T1_n$ = 5sec, else $T1_n$ = 40min | Not Applicable. See Negative OAT Slope Column |
| 30-35 | 30 minutes | If $T2_{n-1}$ > 5min, then $T1_n$ = 5sec, else $T1_n$ = 20min | If $T2_{n-1}$ > 5min, then $T1_n$ = 5sec, else $T1_n$ = 40min | |
| <30 | 20 minutes | If $T2_{n-1}$ > 5min, then $T1_n$ = 5sec, else $T1_n$ = 15min | If $T2_{n-1}$ > 5min, then $T1_n$ = 5sec, else $T1_n$ = 20min | |

| Region | Sensible Load (temperature) | Latent Load (Humidity) | Indoor Blower Speed |
|---|---|---|---|
| Hot and Humid | Medium/low | High | Low |
| Very Hot/Dry | High | Low | High |
| Mixed-Mild | Medium/low | Low | Low/Medium |
| Mixed-Humid | Medium/low | Medium | Low |

FIG. 6

| Region- Hot and Humid | 12 AM to 6 AM | 6 AM to 12 PM | 12 PM to 6 PM | 6 PM to 12AM |
|---|---|---|---|---|
| Y1/Y2 setting | Y1 | More Y1 + Y2 | Y1 + more Y2 | Y1 + reducing Y2 |
| Ambient temperature Slope | Neutral | Positive | Reducing | Reducing/ Neutral |
| Sensible Load | Low | Low | Medium | Medium/Low |
| Latent Load | Medium | High | Very High | High |

FIG. 7

| Region- Very Hot/Dry | 12 AM to 6 AM | 6 AM to 12 PM | 12 PM to 6 PM | 6 PM to 12AM |
|---|---|---|---|---|
| Y1/Y2 setting | Y1 | More Y1 + Y2 | Y1 + more Y2 | Y1 + reducing Y2 |
| Ambient temperature Slope | Neutral | Positive | Reducing | Reducing/ Neutral |
| Sensible Load | Medium | Med/High | High | Med/Low |
| Latent Load | | | Low | |

FIG. 8

| Region-Mixed-Mild | 12 AM to 6 AM | 6 AM to 12 PM | 12 PM to 6 PM | 6 PM to 12AM |
|---|---|---|---|---|
| Y1/Y2 setting | Y1 | Y1 | Y1 + more Y2 | More Y1 + reducing Y2 |
| Ambient temperature Slope | Neutral | Positive | Reducing | Reducing/ Neutral |
| Sensible Load | Low | Low | Medium/High | Medium/Low |
| Latent Load | | | Low | |

FIG. 9

| Region- Hot and Humid | 12 AM to 6 AM | 6 AM to 12 PM | 12 PM to 6 PM | 6 PM to 12AM |
|---|---|---|---|---|
| Y1/Y2 setting | Y1 | More Y1 + Y2 | Y1 + more Y2 | Y1 |
| Ambient temperature Slope | Neutral | Positive | Reducing | Reducing/ Neutral |
| Sensible Load | Low | Low | Medium/High | Medium/Low |
| Latent Load | Low | Low | Medium | Medium/Low |

FIG. 10

DIAGNOSTICS FOR VARIABLE-CAPACITY COMPRESSOR CONTROL SYSTEMS AND METHODS

CROSS-REFERENCE TO RELATED APPLICATIONS

This application claims the benefit of U.S. Provisional Application No. 62/153,209, filed on Apr. 27, 2015, and U.S. Provisional Application No. 62/309,247, filed on Mar. 16, 2016. The entire disclosures of the above applications are incorporated herein by reference.

FIELD

The present disclosure relates to a climate-control system having a variable-capacity compressor and, particularly, to diagnostics for variable-capacity compressor control systems and methods.

BACKGROUND

This section provides background information related to the present disclosure and is not necessarily prior art.

A climate-control system such as, for example, a heat-pump system, a refrigeration system, or an air conditioning system, may include a fluid circuit having an outdoor heat exchanger, an indoor heat exchanger, an expansion device disposed between the indoor and outdoor heat exchangers, and a compressor circulating a working fluid (e.g., refrigerant or carbon dioxide) between the indoor and outdoor heat exchangers. Varying a capacity of the compressor can impact the energy-efficiency of the system and the speed with which the system is able to heat or cool a room or space.

SUMMARY

This section provides a general summary of the disclosure, and is not a comprehensive disclosure of its full scope or all of its features.

In one form, the present disclosure provides a system including a variable-capacity compressor operable at a first capacity and at a second capacity that is higher than the first capacity. The system also includes an outdoor-air-temperature sensor that generates outdoor-air-temperature data corresponding to an outdoor-air temperature. The system also includes a control module that receives a demand signal from a thermostat, that determines whether communication with the outdoor-air-temperature sensor has been interrupted, and that operates the variable-capacity compressor in a first mode in response to determining that communication with the outdoor-air-temperature sensor has not been interrupted and in a fault mode in response to determining that at least one of communication with the outdoor-air-temperature sensor has been interrupted and the outdoor-air-temperature indicated by the outdoor-air-temperature data is outside of a predetermined temperature range. The control module operates the variable-capacity compressor in the first mode by switching the variable-capacity compressor between the first capacity and the second capacity based on the demand signal and the outdoor-air-temperature data and operates the variable-capacity compressor in the fault mode by operating the variable-capacity compressor at one of the first capacity and the second capacity based on the demand signal.

In some configurations, the fault mode includes operating the variable-capacity compressor at only the first capacity.

In some configurations, the fault mode includes operating the variable-capacity compressor at only the second capacity.

In some configurations, the fault mode includes operating the variable-capacity compressor at the first capacity for a first predetermined time period and operating the variable-capacity compressor at the second capacity for a second predetermined time period.

In some configurations, the control module generates an alert in response to determining that communication with the outdoor-air-temperature sensor has been interrupted and the variable-capacity compressor is operating in the fault mode.

In some configurations, the control module outputs the alert to at least one of: a graphical display on the control module indicating that the variable-capacity compressor is operating in the fault mode; the thermostat to display that the variable-capacity compressor is operating in the fault mode; a system controller for a climate-control system that includes the variable-capacity compressor; and a sub-controller for a climate-control system that includes the variable-capacity compressor.

In some configurations, the control module receives and uses local, hourly weather data obtained directly from at least one of an online weather data source and a wifi enabled thermostat when controlling the variable-capacity compressor in the fault mode.

In some configurations, when controlling the variable-capacity compressor in the fault mode, the control module switches to the first mode and follows predetermined run-times for operating the variable-capacity compressor at the first and second capacities based on the outdoor-air-temperature data in response to at least one of determining that communication with the outdoor-air-temperature sensor has been reestablished and determining that the outdoor-air-temperature indicated by the outdoor-air-temperature data is within the predetermined temperature range.

In another form, the present disclosure provides a method that includes receiving, with a control module, a demand signal from a thermostat. The method also includes determining, with the control module, that at least one of communication with an outdoor-air-temperature sensor that generates outdoor-air-temperature data corresponding to an outdoor-air temperature has been interrupted and the outdoor-air-temperature indicated by the outdoor-air-temperature data is outside of a predetermined temperature range. The method also includes operating, with the control module, a variable-capacity compressor operable at a first capacity and at a second capacity that is higher than the first capacity, the control module operating the variable-capacity compressor in a first mode in response to determining that there is communication with the outdoor-air-temperature sensor and the control module and that the outdoor-air-temperature indicated by the outdoor-air-temperature data is within the predetermined range, the control module operating the variable-capacity compressor in a fault mode in response to determining that at least one of communication with the outdoor-air-temperature sensor has been interrupted and that the outdoor-air-temperature indicated by the outdoor-air-temperature data is outside of the predetermined temperature range. The control module operates the variable-capacity compressor in the first mode by switching the variable-capacity compressor between the first capacity and the second capacity based on the demand signal and the outdoor-air-temperature data and operates the variable-capacity compressor in the fault mode by operating the variable-capacity compressor at one of the first capacity and the second capacity based on the demand signal.

In some configurations, the fault mode includes operating the variable-capacity compressor at only the first capacity.

In some configurations, the fault mode includes operating the variable-capacity compressor at only the second capacity.

In some configurations, the fault mode includes operating the variable-capacity compressor at the first capacity for a first predetermined time period and operating the variable-capacity compressor at the second capacity for a second predetermined time period.

In some configurations, the method also includes generating, with the control module, an alert in response to determining that communication with the outdoor-air-temperature sensor has been interrupted and the variable-capacity compressor is operating in the fault mode.

In some configurations, the method also includes outputting, with the control module, the alert to at least one of: a graphical display on the control module indicating that the variable-capacity compressor is operating in the fault mode; the thermostat to display that the variable-capacity compressor is operating in the fault mode; a system controller for a climate-control system that includes the variable-capacity compressor; and a sub-controller for the climate-control system that includes the variable-capacity compressor.

In some configurations, the method also includes receiving and using, with the control module, local, hourly weather data obtained directly from at least one of an online weather data source and a wifi enabled thermostat when controlling the variable-capacity compressor in the fault mode.

In some configurations, when controlling the variable-capacity compressor in the fault mode, the control module switches to the first mode and follows predetermined runtimes for operating the variable-capacity compressor at the first and second capacities based on the outdoor-air-temperature data in response to at least one of determining that communication with the outdoor-air-temperature sensor has been reestablished and determining that the outdoor-air-temperature indicated by the outdoor-air-temperature data is within the predetermined temperature range.

In another form, the present disclosure provides a system that includes a variable-capacity compressor operable at a first capacity and at a second capacity that is higher than the first capacity. The system also includes an outdoor-air-temperature sensor that generates outdoor-air-temperature data corresponding to an outdoor-air temperature. The system also includes a current sensor that generates electrical current data corresponding to electrical current delivered to the compressor. The system also includes a control module that receives a demand signal from a thermostat, the outdoor-air-temperature data, and the electrical current data, that switches the variable-capacity compressor between the first capacity and the second capacity based on the outdoor-air-temperature data and the demand signal, and that determines whether the electrical current data indicates an expected change in the electrical current being delivered to the compressor when the variable-capacity compressor is switched between the first capacity and the second capacity. In response to determining that the electrical current data does not indicate the expected change in the electrical current being delivered to the compressor when the variable-capacity compressor is switched between the first capacity and the second capacity, the control module performs at least one of operating the variable-capacity compressor in a fault mode, generating an alert indicating that the variable-capacity compressor is operating in the fault mode, and mitigating actions.

In some configurations, the current sensor measures the electrical current delivered to an outdoor condensing unit that includes the variable-capacity compressor.

In some configurations, the control module operates the variable-capacity compressor in the fault mode, in response to determining that the electrical current data does not indicate the expected change in the electrical current being delivered to the compressor when the variable-capacity compressor is switched between the first capacity mode and the second capacity mode, and wherein the control module determines whether the variable-capacity compressor is stuck operating at the first capacity or at the second capacity.

In some configurations, the control module generates the alert in response to determining that the electrical current data does not indicate the expected change in the electrical current being delivered to the compressor when the variable-capacity compressor is switched between the first capacity and the second capacity, and wherein the control module outputs the alert to at least one of: a graphical display on the control module indicating that the variable-capacity compressor is operating in the fault mode; the thermostat to indicate that the variable-capacity compressor is operating in the fault mode; a system controller for a climate-control system that includes the variable-capacity compressor; and a sub-controller for the climate-control system that includes the variable-capacity compressor.

In some configurations, the control module performs mitigating actions in response to determining that the electrical current data does not indicate the expected change in the electrical current being delivered to the compressor when the variable-capacity compressor is switched between the first capacity and the second capacity, the mitigating actions including at least one of: cycling the variable-capacity compressor after a predetermined time period in response to the outdoor-air temperature being within a predetermined temperature range; operating an indoor fan to blow air over an evaporator coil connected to the variable-capacity compressor; and increasing a fan speed of the indoor fan to blow over the evaporator coil connected to the variable-capacity compressor.

In some configurations, the control module determines whether the variable-capacity compressor is stuck operating at the first capacity or at the second capacity and determines the mitigating actions to be performed based on whether the variable-capacity compressor is stuck operating at the first capacity or at the second capacity.

In another form, the present disclosure provides a method that includes generating, with an outdoor-air-temperature sensor, outdoor-air-temperature data corresponding to an outdoor-air temperature. The method also includes generating, with a current sensor, electrical current data corresponding to electrical current delivered to the compressor. The method also includes receiving, with a control module, the outdoor-air-temperature data, the electrical current data, and a demand signal from a thermostat. The method also includes switching, with the control module, a variable-capacity compressor between operation in a first capacity and a second capacity that is higher than the first capacity based on the outdoor-air-temperature data and the demand signal. The method also includes determining, with the control module, whether the electrical current data indicates an expected change in the electrical current being delivered to the compressor when the variable-capacity compressor is switched between the first capacity mode and the second capacity mode. The method also includes performing, with the control module, at least one of operating the variable-capacity compressor in a fault mode, generating an alert indicating that the variable-capacity compressor is operating in the fault mode, and mitigating actions in response to determining that the electrical current data does not indicate the expected change in the electrical current being delivered to the compressor when the variable-capacity compressor is switched between the first capacity and the second capacity.

In some configurations, the current sensor measures the electrical current delivered to an outdoor condensing unit that includes the variable-capacity compressor.

In some configurations, the control module operates the variable-capacity compressor in the fault mode, in response to determining that the electrical current data does not indicate the expected change in the electrical current being delivered to the compressor when the variable-capacity compressor is switched between the first capacity mode and the second capacity mode, and wherein the control module determines whether the variable-capacity compressor is stuck operating at the first capacity or at the second capacity.

In some configurations, the control module generates the alert in response to determining that the electrical current data does not indicate the expected change in the electrical current being delivered to the compressor when the variable-capacity compressor is switched between the first capacity mode and the second capacity mode, the method further comprising outputting, with the control module, the alert to at least one of a graphical display on the control module indicating that the variable-capacity compressor is operating in the fault mode; the thermostat indicating that the variable-capacity compressor is operating in the fault mode; a system controller for a climate-control system that includes the variable-capacity compressor; and a sub-controller for the climate-control system that includes the variable-capacity compressor.

In some configurations, the control module performs mitigating actions in response to determining that the electrical current data does not indicate the expected change in the electrical current being delivered to the compressor when the variable-capacity compressor is switched between the first capacity and the second capacity, the mitigating actions including at least one of: cycling the variable-capacity compressor after a predetermined time period in response to the outdoor-air temperature being within a predetermined temperature range; operating an indoor fan to blow air over an evaporator coil connected to the variable-capacity compressor; and increasing a fan speed of the indoor fan to blow over the evaporator coil connected to the variable-capacity compressor.

In some configurations, the control module determines whether the variable-capacity compressor is stuck operating at the first capacity or at the second capacity and determines the mitigating actions to be performed based on whether the variable-capacity compressor is stuck operating at the first capacity or at the second capacity.

In another form, the present disclosure provides a system including a variable-capacity compressor operable at a first capacity and at a second capacity that is higher than the first capacity. The system also includes an outdoor-air-temperature sensor that generates outdoor-air-temperature data corresponding to an outdoor-air temperature. The system also includes a control module that receives a demand signal from a thermostat, that determines whether the variable-capacity compressor has been activated since a most recent power cycling of the variable-capacity compressor in response to receiving the demand signal, that operates the variable-capacity compressor at the second capacity for at least a predetermined time period in response to determining that the variable-capacity compressor has not been activated since the most recent power cycling of the variable-capacity compressor, and that switches the variable-capacity compressor between the first capacity and the second capacity based on the demand signal and the current outdoor air temperature in response to determining that the variable-capacity compressor has been activated since the most recent power cycling of the variable-capacity compressor.

In some configurations, the system also includes a current sensor that generates electrical current data corresponding to electrical current delivered to the compressor, wherein the control module verifies that the variable-capacity compressor is operating at the second capacity in response to determining that the variable-capacity compressor has not been activated since the most recent power cycling of the variable-capacity compressor based on the electrical current data and outputs an alert indicating that the control module verifies that the variable-capacity compressor is operating at the second capacity.

In another form, the present disclosure provides a method that includes generating, with an outdoor-air-temperature sensor, outdoor-air-temperature data corresponding to an outdoor-air temperature. The method also includes receiving, with a control module, a demand signal from a thermostat. The method also includes determining, with the control module, whether a variable-capacity compressor, that is operable at a first capacity and at a second capacity that is higher than the first capacity, has been activated since a most recent power cycling of the variable-capacity compressor in response to receiving the demand signal. The method also includes operating, with the control module, the variable-capacity compressor at the second capacity for at least a predetermined time period in response to determining that the variable-capacity compressor has not been activated since the most recent power cycling of the variable-capacity compressor. The method also includes switching, with the control module, the variable-capacity compressor between the first capacity and the second capacity based on the demand signal and the current outdoor air temperature in response to determining that the variable-capacity compressor has been activated since the most recent power cycling of the variable-capacity compressor.

In some configurations, the method also includes generating, with a current sensor, electrical current data corresponding to electrical current delivered to the compressor. The method also includes verifying, with the control module, that the variable-capacity compressor is operating at the second capacity in response to determining that the variable-capacity compressor has not been activated since the most recent power cycling of the variable-capacity compressor based on the electrical current data. The method also includes outputting, with the control module, an alert indicating that the control module verifies that the variable-capacity compressor is operating at the second capacity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a lookup table that can be used in the method and algorithm of FIG. 2;

FIG. 4 is another lookup table that can be used in the method and algorithm of FIG. 2;

FIG. 6 is a table illustrating relative sensible and latent loads for exemplary climate types;

FIG. 7 is a table providing data for a first climate type at various times of a day;

FIG. 8 is a table providing data for a second climate type at various times of a day;

FIG. 9 is a table providing data for a third climate type at various times of a day;

FIG. 10 is a table providing data for a fourth climate type at various times of a day.

Corresponding reference numerals indicate corresponding parts throughout the several views of the drawings.

DETAILED DESCRIPTION

Figure 1:
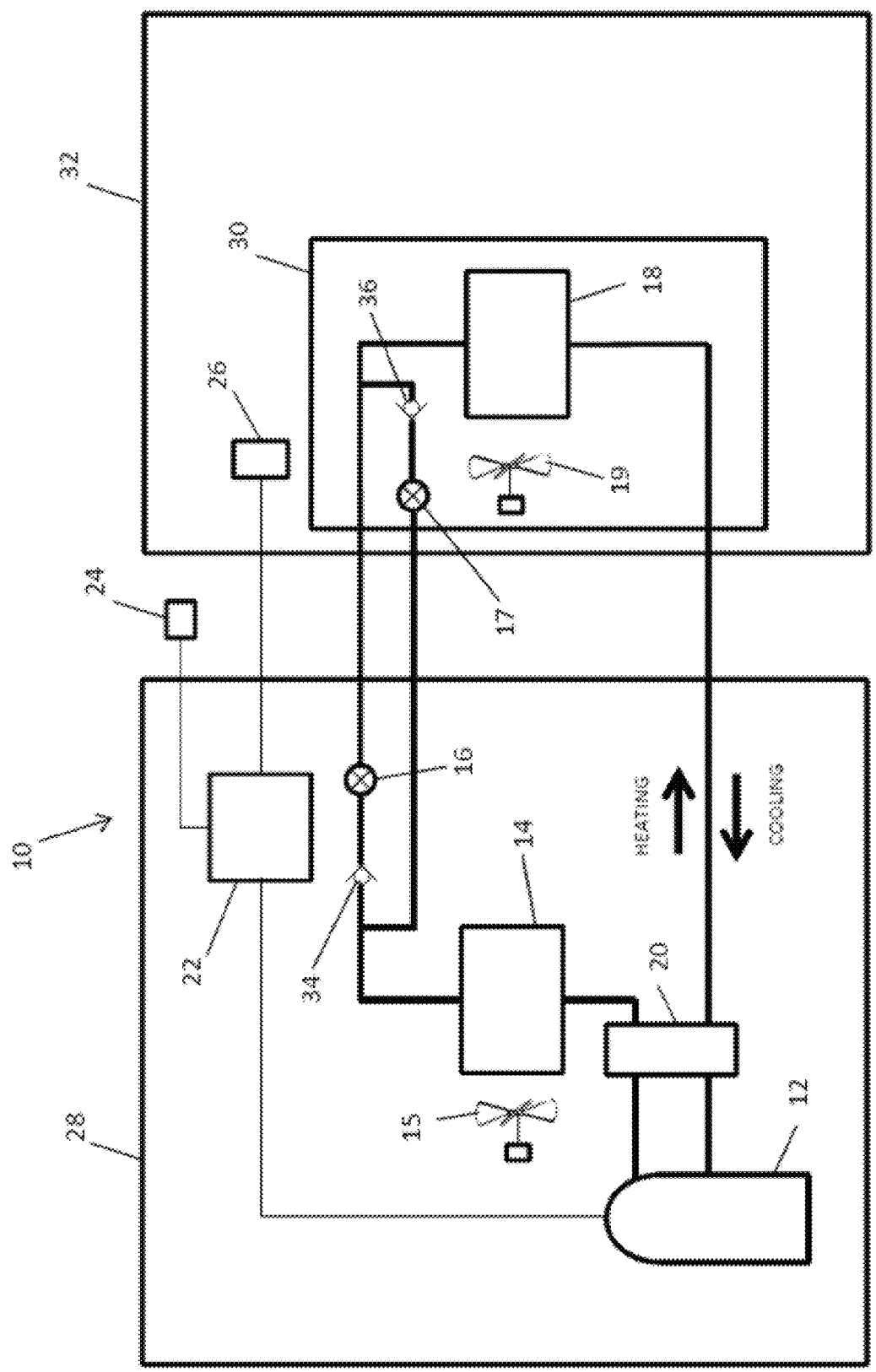
FIG. 1 is a schematic representation of a heat-pump system having a variable-capacity compressor according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a climate-control system 10 is provided that may include a variable-capacity compressor (or a variable-capacity group of compressors) 12, an outdoor heat exchanger 14, an outdoor blower 15, a first expansion device 16, a second expansion device 17, an indoor heat exchanger 18, and an indoor blower 19. In the particular configuration shown in FIG. 1, the system 10 is a heat-pump system having a reversing valve 20 operable to control a direction of working fluid flow through the system 10 to switch the system 10 between a heating mode and a cooling mode. In some configurations, the system 10 may be an air-conditioning system or a refrigeration system, for example, and may be operable in only the cooling mode.

As will be described in more detail below, a controller or control module 22 may control operation of the compressor 12 and may switch the compressor 12 between a low-capacity mode and a high-capacity mode based on data received from an outdoor-air-temperature sensor 24, a signal received from a thermostat 26, a comparison between a runtime T of the compressor 12 and a predetermined low-capacity runtime T1, and/or a comparison between a previous high-capacity runtime T2 with a predetermined value.

The control module 22 may minimize or reduce employment of high-capacity-mode operation to minimize or reduce energy usage while maintaining an acceptable level of comfort within a space to be heated or cooled.

The compressor 12 can be or include a scroll compressor, a reciprocating compressor, or a rotary vane compressor, for example, and/or any other type of compressor. The compressor 12 may be any type of variable-capacity compressor that is operable in at least a low-capacity mode and a high-capacity mode. For example, the compressor 12 may be or include a multi-stage compressor, a group of independently operable compressors, a multi-speed or variable-speed compressor (having a variable-speed or multi-speed motor), a compressor having modulated suction (e.g., blocked suction), a compressor having fluid-injection (e.g., an economizer circuit), a pulse-width-modulated scroll compressor configured for scroll separation (e.g., a digital scroll compressor), a compressor having variable-volume-ratio valves configured to leak intermediate-pressure working fluid, or a compressor having two or more of the above capacity modulation means. It will be appreciated that the compressor 12 could include any other additional or alternative structure for varying its capacity and/or the operating capacity of the system 10.

It will be appreciated that the low-capacity and/or high-capacity modes may be continuous, steady-state operating modes, or compressor 12 may be modulated (e.g., pulse-width-modulated) during operation in the low-capacity mode and/or during operation in the high-capacity mode. Exemplary variable-capacity compressors are disclosed in assignee's commonly owned U.S. Pat. No. 8,616,014, U.S. Pat. No. 6,679,072, U.S. Pat. No. 8,585,382, U.S. Pat. No. 6,213,731, U.S. Pat. No. 8,485,789, U.S. Pat. No. 8,459,053, and U.S. Pat. No. 5,385,453, the disclosures of which are hereby incorporated by reference.

The compressor 12, the outdoor heat exchanger 14, the outdoor blower 15, the first expansion device 16 and the reversing valve 20 may be disposed in an outdoor unit 28. The second expansion device 17, the indoor heat exchanger 18 and the indoor blower 19 may be disposed within an indoor unit 30 (e.g., an air handler or furnace) disposed within a home or other building 32. A first check valve 34 may be disposed between outdoor heat exchanger 14 and the first expansion device 16 and may restrict or prevent fluid flow through the first expansion device 16 in the cooling mode and may allow fluid flow through the first expansion device 16 in the heating mode. A second check valve 36 may be disposed between the second expansion device 17 and the indoor heat exchanger 18 and may restrict or prevent fluid flow through the second expansion device 17 in the heating mode and may allow fluid flow through the second expansion device 17 in the cooling mode.

The outdoor-air-temperature sensor 24 is disposed outside of the building 32 and within or outside of the outdoor unit 28 and is configured to measure an outdoor ambient air temperature and communicate the outdoor ambient air temperature value to the control module 22 intermittently, continuously or on-demand. In some configurations, the outside-air-temperature sensor 24 could be a thermometer or other sensor associated with a weather monitoring and/or weather reporting system or entity. In such configurations, the control module 22 may obtain the outdoor-air-temperature (measured by the sensor 24) from the weather monitoring and/or weather reporting system or entity via, for example, an internet, Wi-Fi, Bluetooth®, Zigbee®, power-line carrier communication (PLCC), or cellular connection or any other wired or wireless communication protocol.

For example, the control module 22 may communicate with the weather monitoring and/or weather reporting system or entity over the internet via a Wi-Fi connection to a Wi-Fi router located in or associated with the building 32. The thermostat 26 is disposed inside of the building 32 and outside of the indoor unit 30 and is configured to measure an air temperature within a room or space to be cooled or heated by the system 10. The thermostat 26 can be a single-stage thermostat, for example, that generates only one type of demand signal in response to a temperature within the room or space rising above (in the cooling mode) or falling below (in the heating mode) a setpoint temperature. The control module 22 could be disposed in any suitable location, such as inside of or adjacent to the outdoor unit 28 or inside of or adjacent to the indoor unit 30, for example.

In the cooling mode, the outdoor heat exchanger 14 may operate as a condenser or as a gas cooler and may cool discharge-pressure working fluid received from the compressor 12 by transferring heat from the working fluid to air forced over the outdoor heat exchanger 14 by the outdoor blower 15, for example. The outdoor blower 15 could include a fixed-speed, multi-speed or variable-speed fan. In the cooling mode, the indoor heat exchanger 18 may operate as an evaporator in which the working fluid absorbs heat from air forced over the indoor heat exchanger 18 by the indoor blower 19 to cool a space within the home or building 32. The indoor blower 19 could include a fixed-speed, multi-speed or variable-speed fan. In the heating mode, the outdoor heat exchanger 14 may operate as an evaporator, and the indoor heat exchanger 18 may operate as a condenser or as a gas cooler and may transfer heat from working fluid discharged from the compressor 12 to a space to be heated.

Figure 2:
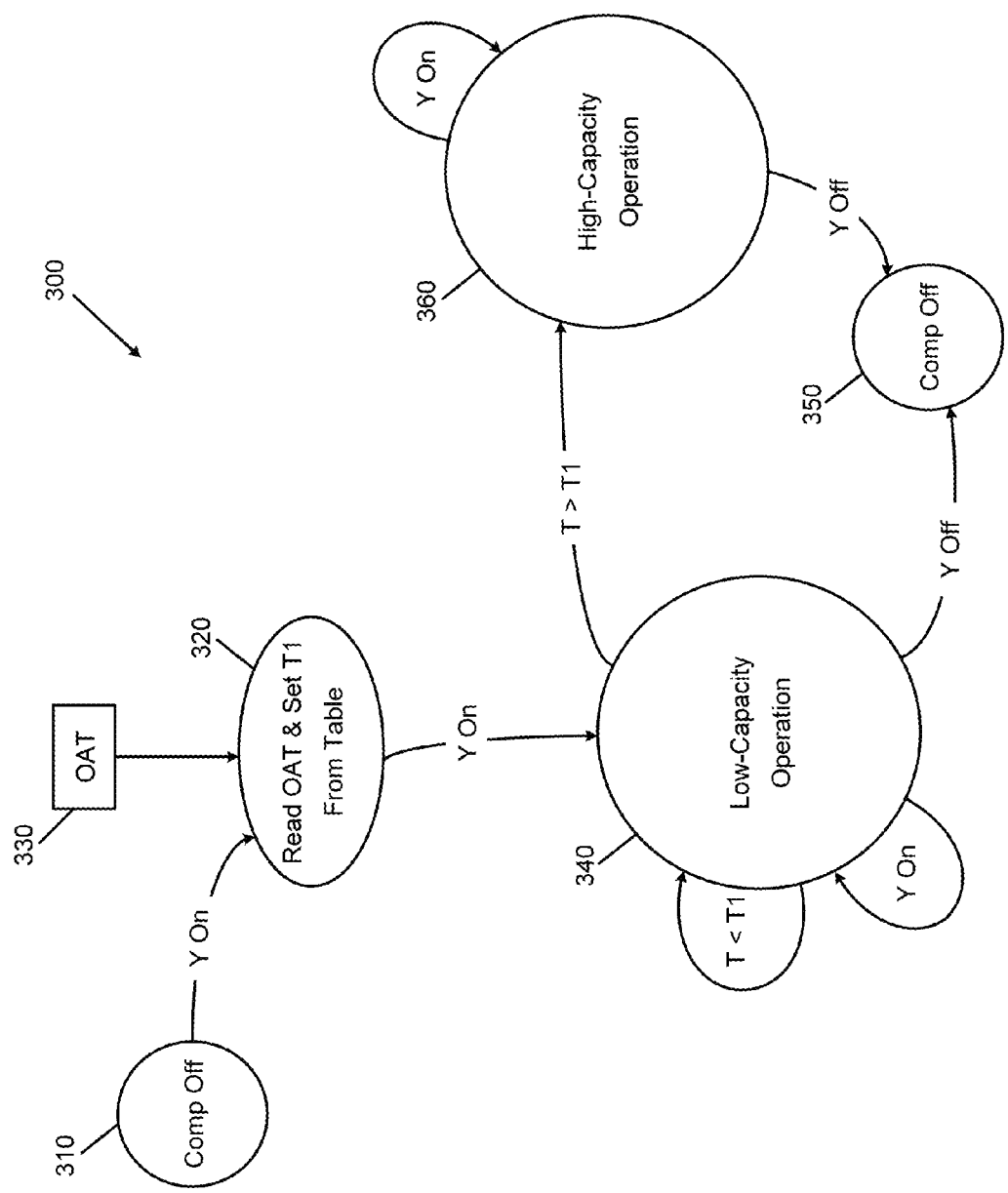
FIG. 2 is a state diagram illustrating another method and algorithm for controlling the variable-capacity compressor of FIG. 1.

Referring now to FIG. 2, a method and control algorithm 300 will be described that can be executed by the control module 22. The algorithm 300 may control operation of the compressor 12 and switch the compressor 12 between the low-capacity and high-capacity modes. In an initial state 310, the compressor 12 may be off. The thermostat 26 may send a demand signal Y to the control module 22 in response to an air temperature in the space to be heated or cooled by the system 10 dropping below (in the heating mode) or rising above (in the cooling mode) a selected setpoint temperature. In response to receipt of the demand signal Y, the control module 22 may initiate operation of the compressor 12 in the low-capacity mode (state 340) and simultaneously, at state 320, read an outdoor air temperature (received from sensor 24 at input 330) and set a low-capacity runtime T1 based on data from table 345 (FIG. 3). Thereafter, the compressor 12 may continue to run in the low-capacity mode until the cooling demand is satisfied (i.e., the temperature in the space to be cooled drops below the selected setpoint temperature as indicated by the thermostat 26 and the thermostat switches the demand signal Y to "off"), until the total runtime T of the compressor 12 since the receipt of the demand signal Y surpasses the low-capacity runtime T1 set at state 320, or until the compressor 12 or system 10 is manually shutdown or a diagnostic or protection algorithm overrides the algorithm 300.

If demand is satisfied before the total runtime T reaches the predetermined low-capacity runtime T1, the control module 22 may shutdown the compressor 12 (state 350). If the compressor 12 has been running for longer than the predetermined low-capacity runtime T1 without satisfying the demand, the control module 22 may switch the compressor 12 from the low-capacity mode to the high-capacity mode (state 360). The compressor 12 may continue to run in the high-capacity mode until the cooling demand is satisfied (or until the compressor 12 or system 10 is manually shutdown or a diagnostic or protection algorithm overrides the algorithm 100). When demand is satisfied, the control module 22 may shutdown the compressor 12 (state 350). When the compressor 12 is shut down after satisfying demand by operating in the high-capacity mode, the control module 22 may record the runtime T2 of the compressor 12 in the high-capacity mode and store the high-capacity runtime T2 in a memory module associated with the control module 22.

As described above, FIG. 3 depicts the table 345 from which the control module 22 determines the low-capacity runtime T1. First, the control module 22 determines from which row of the table 345 to read based on the outdoor ambient temperature (OAT) value received at input 330. That is, the row of the table 345 from which the control module 22 reads is the row having an OAT range that includes the OAT value received at input 330. If the control module 22 has not received a demand signal Y from the thermostat 26 in a relatively long predetermined period of time (e.g., days, weeks or longer), the control module 22 may initially set the low-capacity runtime T1 at a default or baseline value listed in the Baseline T1 column at the corresponding OAT row of table 345.

With the low-capacity runtime T1 set at the baseline value corresponding to the OAT at the time of the initiation of the demand signal Y, the control module 22 may cause the compressor 12 to run in the low-capacity mode (state 340) until demand is met or until the compressor runtime T surpasses the set low-capacity runtime T1. If demand has not been met when the runtime T reaches the set low-capacity runtime T1, the control module 22 may switch the compressor 12 to the high-capacity mode (state 360). The compressor 12 may continue operating in the high-capacity mode until demand is met. Once demand is met, the controller 22 may record in the high-capacity runtime T2, as described above.

Upon receipt of a subsequent demand signal Y, the control module 22 may again determine a low-capacity runtime value T1 from the table 345. This time, the control module 22 may determine if the OAT falls within one of a plurality of override ranges 347. For example, override ranges 347 in the cooling mode may include 85-90° F. and >90° F., and override ranges 347 in the heating mode may include 40-45° F. and <40° F. If the OAT value received at input 330 falls within one of the override ranges 347, the control module 22 may set the low-capacity runtime T1 at an override value determined by referencing the override T1 column at the corresponding OAT row.

The override value for the low-capacity runtime T1 may be determined based on a previous high-capacity runtime $T2_{n-1}$. For example, if the previous high-capacity runtime $T2_{n-1}$ is greater than a predetermine value (e.g., five minutes), the control module 22 may set the low-capacity runtime T1 to a first value (e.g., a short time period such as five seconds). If the previous high-capacity runtime $T2_{n-1}$ is less than the predetermine value (e.g., five minutes), the control module 22 may set the low-capacity runtime T1 to a second value (e.g., a longer time period such as twenty minutes or forty minutes). The control module 22 may then cause the compressor 12 to run in the low-capacity mode (state 340) until demand is met or until the compressor runtime T reaches the low-capacity runtime T1, at which time the control module 22 may switch the compressor to the high-capacity mode (state 360).

If the OAT falls within an OAT range that is not one of the override ranges 347, then the control module 22 will continue to set the low-capacity runtime T1 at the baseline value listed in the baseline T1 column. As described above, the control module 22 may cause the compressor 12 to run in the low-capacity mode until demand is met or until the compressor runtime T reaches the low-capacity runtime T1, at which time the control module 22 may switch the compressor 12 to the high-capacity mode until demand is met.

In another configuration, the algorithm 300 may include determining the low-capacity runtime T1 based on table 445 (FIG. 4) instead of table 345. As described above, the control module 22 may continuously or intermittently receive OAT data from the sensor 24 and may store the OAT data in a memory module. As described above, once the demand signal Y is received, the control module 22 may, at state 320, read the current OAT (from input 330) and set the low-capacity runtime T1 from the table 445.

If the control module 22 has not received a demand signal Y from the thermostat 26 in a relatively long predetermined period of time (e.g., days, weeks or longer), the control module 22 may initially set the low-capacity runtime T1 at a default or baseline value listed in Baseline T1 column 446 at the OAT row of table 445 that corresponds to the current OAT received at input 330. With the low-capacity runtime T1 set at the baseline value, the control module 22 may then cause the compressor 12 to operate in the low-capacity mode (state 340) until demand is met, or until the compressor runtime T reaches the set low-capacity runtime T1, at which time the control module 22 will run the compressor 12 in the high-capacity mode (state 360) until demand is met, in accordance with the algorithm 300 described above. The control module 22 may record the high-capacity runtime T2 for each run cycle of the compressor 12.

Upon receipt of a subsequent demand signal Y, the control module 22 may again determine a low-capacity runtime value T1 from the table 445. This time, the control module 22 may read the current OAT and determine a slope of the OAT over a predetermined time period (e.g., over the last twenty minutes, but may be any predetermined period of time that is suitably indicative of system conditions). If the OAT slope is within a neutral slope range (where the slope is greater than −0.3 degrees per 20 minutes and less than 0.3 degrees per 20 minutes, for example), then the control module 22 may set the low-capacity runtime T1 at the baseline value listed in the Baseline T1 column 446 at the OAT row of table 445 that corresponds to the current OAT. If the OAT slope is within a positive slope range (where the slope is greater than 0.3 degrees per 20 minutes, for example), then the control module 22 may set the low-capacity runtime T1 at the value listed in the Positive OAT Slope column 447 at the OAT row of table 445 that corresponds to the current OAT. If the OAT slope is within a first negative slope range (where the slope is less than −0.3 degrees per 20 minutes and greater than −0.6 degrees per 20 minutes, for example), then the control module 22 may set the low-capacity runtime T1 at the value listed in the Negative OAT Slope column 448 at the OAT row of table 445 that corresponds to the current OAT. If the OAT slope is within a second negative slope range (where the slope is less than −0.6 degrees per 20 minutes, for example), then the control module 22 may set the low-capacity runtime T1 at the value listed in the Extreme Negative OAT Slope column 449 at the OAT row of table 445 that corresponds to the current OAT.

While the OAT slope is described above as being determined over a predetermined time period, the OAT slope could also be determined by comparing OAT values at the beginning of a current compressor operating cycle (i.e., when the current demand signal Y is received) and at the end of the previous compressor operating cycle (i.e., when the last demand signal Y switched off). Still other methods for determining the OAT slope could be employed.

As shown in FIG. 4, some or all of the rows of column 447 and column 448 include steps for determining the low-capacity runtime T1 based on the previous high-capacity runtime $T2_{n-1}$ (i.e., the high-capacity runtime T2 of the previous run cycle in which the demand signal Y was constantly on or demand for heating or cooling was constantly present). For example, in the row of the Positive OAT Slope column 447 corresponding to an OAT of greater than 90° F. if the previous high-capacity runtime $T2_{n-1}$ was greater than five minutes, then the current low-capacity runtime $T1_n$ should be set to five seconds; and if the previous high-capacity runtime $T2_{n-1}$ was less than or equal to five minutes, then the current low-capacity runtime $T1_n$ should be set to thirty minutes. As shown in FIG. 4, the above time and temperature values may vary for the various rows of columns 447 and 448.

Further, as shown in FIG. 4, the Extreme Negative OAT Slope column 449 may simply include predetermined values for each OAT range that may not be dependent upon a previous high-capacity runtime. In some configurations, the Extreme Negative OAT Slope column 449 may refer the algorithm to the Negative OAT Slope column 448 for colder OAT ranges (e.g., below 45° F.). For example, if the OAT slope is less than −0.6 degrees per 20 minutes and the current OAT is less than 45° F., the control module 22 may set the low-capacity runtime T1 in accordance with the Negative OAT Slope column 448.

After setting the low-capacity runtime T1 in accordance with table 445, the control module 22 may operate the compressor 12 in the low-capacity mode (state 340) until demand is met, or until the compressor runtime T reaches the set low-capacity runtime T1 (at which time the control module 22 will switch the compressor to the high-capacity mode until demand is met), in accordance with the algorithm 300 described above.

OAT slope is generally a good indicator or estimate of the time of day. Therefore, adjusting low-capacity and high-capacity runtimes based on OAT slope effectively adjusts low-capacity and high-capacity runtimes to account for the diurnal temperature profile. That is, during the course of a day, the OAT often changes according to a fairly standard profile. When the OAT is rising in the morning, the total compressor runtime T is typically shorter (during the cooling season) than when the OAT is falling in the evening because the house or building in which the system 10 is installed has accumulated a thermal load throughout the day that is still present in the evening. For the heating mode, the load shifts to early morning, i.e., more high-capacity runtime during positive slope periods or early morning part of day, and less low-capacity runtime during negative slope periods or evenings, since the house or building absorbs heat during the day. Therefore, adjusting the low-capacity and high-capacity runtimes based on OAT slope or time of day accounts for the thermal load on the house or building and increases comfort for the occupants.

Figure 5:
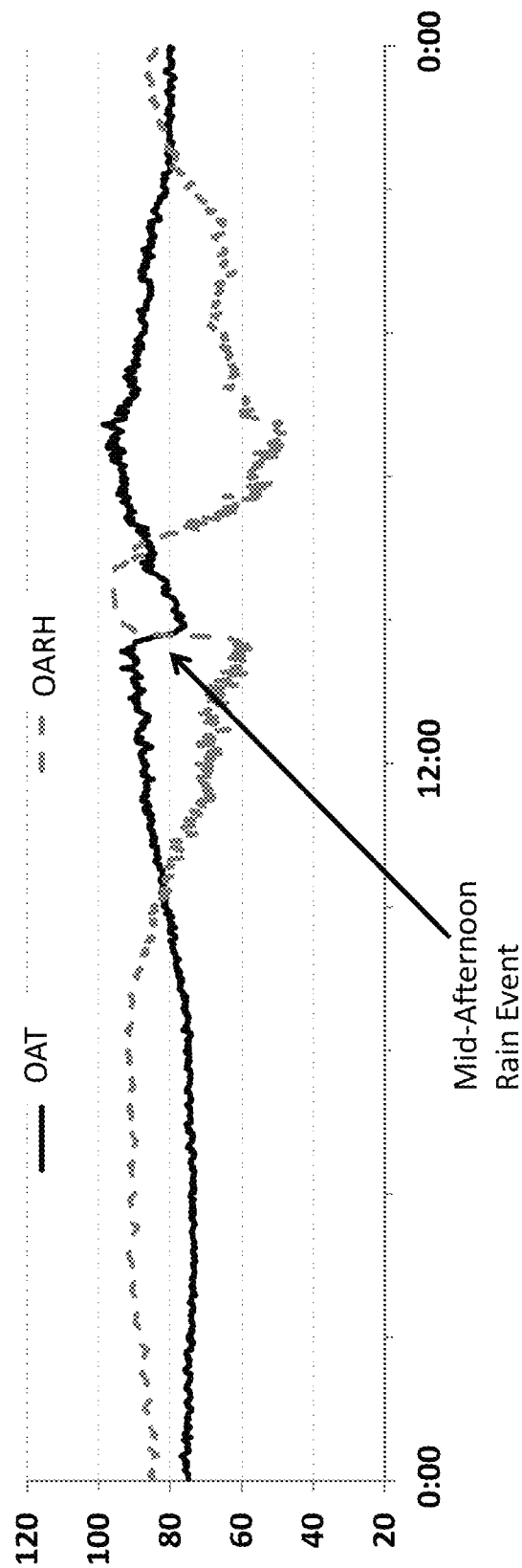
FIG. 5 is a graph depicting outdoor ambient temperature and outdoor ambient relative humidity versus time of day for an exemplary geographical location.

Furthermore, outdoor ambient relative humidity (OARH) often rises as OAT decreases and falls as OAT increases (as shown in FIG. 5). Therefore, OAT slope also indicates or approximates the slope of OARH. Thus, extreme negative OAT slopes (e.g., OAT slope less than −0.6 degrees per 20 minutes) can indicate an increased demand for dehumidification due to a mid-afternoon rain event, for example. Therefore, determining the OAT slope and adjusting low-capacity and high-capacity runtimes based on the OAT slope allows the algorithm 300 to account for the thermal load of the house or building and thermal load delay due to diurnal profile and allows the algorithm 300 to account for slope of ambient relative humidity without the use of a relative humidity sensor.

FIG. 5 depicts the OAT and OARH profile for a given day at a given location. As shown in FIG. 5, a mid-afternoon rain event can be accompanied by a sharp decrease in OAT and a corresponding sharp increase in OARH. Therefore, even though the OAT has decreased as a result of the rain event, demand for cooling may remain high due to the increased humidity and the possibility of OAT returning to its previous high before sunset. Therefore, such events having an extreme negative OAT slope are accounted for in table 445 (FIG. 4) at the Extreme Negative OAT Slope column 449, which assigns a very short low-capacity runtime T1 regardless of the length of any previous high-capacity runtime.

As described above, the indoor blower 19 (FIG. 1) could be a multi-speed blower that can be set at two or more speeds. Therefore, the system 10 may be operable in at least four different modes. In a first mode, the compressor 12 may operate in the low-capacity mode, and the indoor blower 19 may operate at a low speed. In a second mode, the compressor 12 may operate in the low-capacity mode, and the indoor blower 19 may operate at a high speed. In a third mode, the compressor 12 may operate in the high-capacity mode, and the indoor blower 19 may operate at the low speed. In a fourth mode, the compressor 12 may operate in the high-capacity mode, and the indoor blower 19 may operate at the high speed.

In some configurations, the speed of the indoor blower 19 may be set manually (e.g., by an installation contractor) and thereafter, the speed of the indoor blower 19 may be fixed at that speed. The speed of the indoor blower 19 could be selected based on the climate of the region (specifically, temperatures and humidity levels) in which the system 10 is installed. For example, as shown in FIG. 6, in regions with hot and humid climates (e.g., sub-tropical and tropical climates), the indoor blower 19 may be set to the low setting because lower indoor blower speeds are advantageous for faster dehumidification. In regions with very hot and dry climates (e.g., desert climates like the Southwest United States), the indoor blower 19 may be set to the high setting because higher indoor blower speeds are more advantageous for quickly reducing sensible heat. In regions with mixed temperatures and mild humidity, the indoor blower 19 may be set to the low or medium setting. In regions with mixed temperatures and higher humidity, the indoor blower 19 may be set to the low setting.

In the configurations in which the speed of the indoor blower 19 is set at installation and is fixed thereafter, the system 10 (having variable-capacity compressor 12) can be modulated between two modes: either between the first and third modes described above or between the second and fourth modes described above.

In other configurations, the control module 22 may be in communication with the indoor blower 19 and may be configured to modulate the speed of the indoor blower 19. In such configurations, the control module 22 may be configured to switch the system 10 among the first, second, third and fourth modes (i.e., by modulating the compressor 12 between the low-capacity and high-capacity modes and by modulating the indoor blower 19 between high and low speeds). The control module 22 may switch among the first, second, third and fourth modes depending on OAT, OAT slope, time of day, low-capacity and high-capacity runtimes T1, T2, indoor relative humidity, outdoor relative humidity, historical weather data and/or forecasted weather data, for example.

It will be appreciated that the tables 345 and 445 and runtimes T1, T2 could also be adjusted based on the climate of the region in which the system 10 is installed. FIGS. 7-10 provide overviews of the exemplary regions of FIG. 6 including low-capacity/high-capacity (Y1/Y2) compressor settings, OAT slopes, sensible loads and latent loads at various times of the day.

The control module 22 may include a graphical display for indicating a current operating mode or stage of the compressor 12 or climate-control system 10. For example, the graphical display may include one or more lights, such as LEDs, configured to flash in a specified sequence corresponding to the current operating mode or stage of the compressor 12 or climate-control system 10. For example, for a variable-capacity compressor that is operable in a low-capacity mode and a high-capacity mode, the graphical display may flash in a first specified pattern, such as a single flash followed by a long pause, when the variable-capacity compressor is operating in the low-capacity mode and in a second specified pattern, such as two quick flashes followed by a long pause, when the variable-capacity compressor is operating in the high-capacity mode. Alternatively, or additionally, the graphical display may include an alpha-numeric display that may display a letter or code indicating the current operating mode or stage of the compressor 12 or climate-control system 10.

Additionally or alternatively, an indication of the current operating mode or stage of the compressor 12 or climate-control system 10 may be displayed on the thermostat 26. For example, the control module 22 may communicate the current operating mode or stage of the compressor 12 or climate-control system 10 to the thermostat 25 and the thermostat may include a graphical display for indicating the current operating mode or stage of the compressor 12 or climate-control system 10.

Additionally or alternatively, the thermostat 26 may be a Wi-Fi enabled thermostat 26 capable of communicating over a Wi-Fi network in the vicinity of the thermostat 26, such as a Wi-Fi network in the building associated with the thermostat 26. For example, the Wi-Fi enabled thermostat 26 may provide information to a thermostat control application, such as a mobile application, a web application, and/or a webpage, associated with a user of the thermostat 26, such as a homeowner or administrator of a commercial building associated with the thermostat 26. In such case, the current operating mode or stage of the compressor 12 or climate-control system 10 may be communicated for display on the thermostat control application. For example, the control module 22 may communicate the current operating mode or stage of the compressor 12 or climate-control system 10 to the Wi-Fi enabled thermostat 26, which, in turn, may communicate the current operating mode or stage of the compressor 12 or climate-control system 10 to a server associated with the thermostat control application. The server associated with the thermostat control application may then communicate the current operating mode or stage of the compressor 12 or climate-control system 10 to the thermostat control application, such as a mobile application, a web application, and/or a webpage, for display to a user of the thermostat 26 and associated thermostat control application.

Additionally or alternatively, the current operating mode or stage of the compressor 12 or climate-control system 10 may be communicated to a system controller or sub-controller for the climate-control system 10. For example, the current operating mode or stage of the compressor 12 or climate-control system 10 may be communicated by the control module 22 to a refrigeration or HVAC system controller associated with the climate-control system 10 or a roof-top unit controller, compressor rack controller, or other sub-controller for the climate-control system 10 for display on a graphical display to a user, operator, contractor, or technician of the climate-control system 10. Additionally or alternatively, the current operating mode or stage of the compressor 12 or climate-control system 10 may be communicated to a building automation system and/or a building automation system controller for the building associated with the climate-control system 10.

Figure 11:
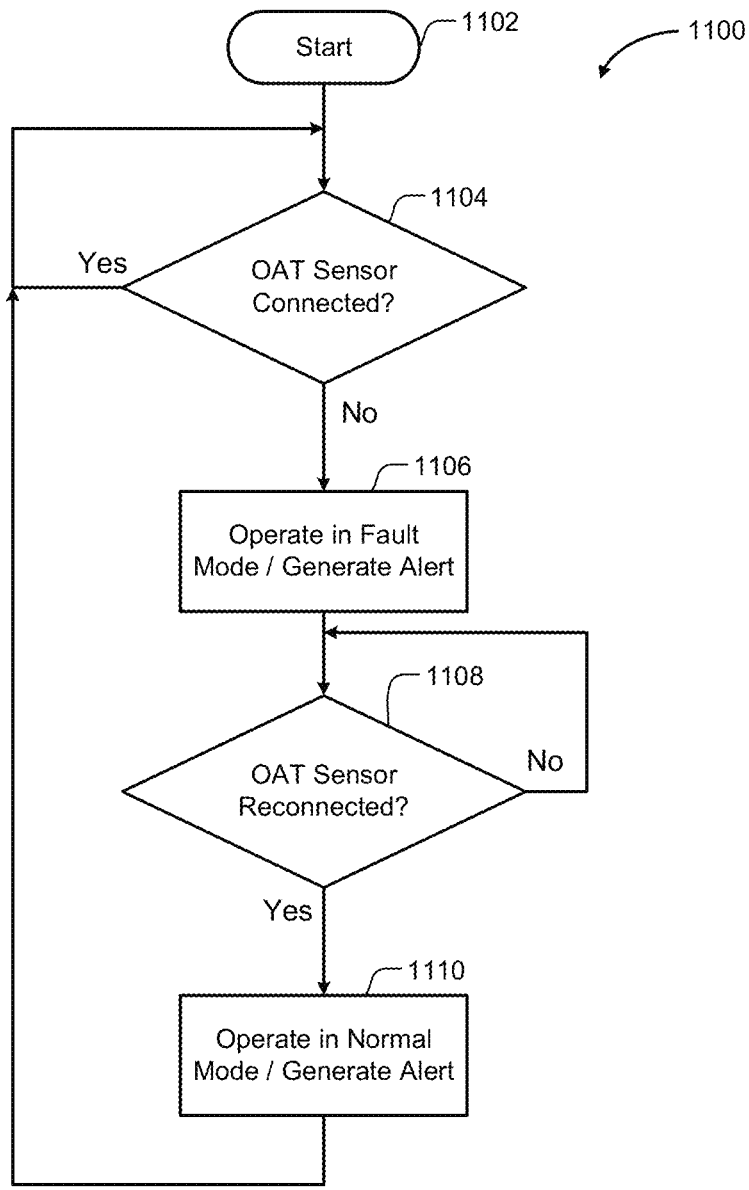
FIG. 11 is a flow chart illustrating a diagnostics algorithm for a variable-capacity compressor according to the principles of the present disclosure.

Referring now to FIG. 11, a method and control algorithm 1100 will be described that can be executed by the control module 22 for operation in a fault mode in the event communication with the outdoor-air-temperature sensor 24 is disrupted. For example, communication with the outdoor-air-temperature sensor 24 may be disrupted if the outdoor-air-temperature sensor 24 is damaged or malfunctioning. If communication between the control module 22 and the outdoor-air-temperature sensor 24 is through a wired connection, communication with the outdoor-air-temperature sensor 24 may be disrupted if the wired connection is severed or malfunctioning. If communication between the control module 22 and the outdoor-air-temperature sensor 24 is through a wireless connection, communication with the outdoor-air-temperature sensor 24 may be disrupted if the outdoor-air-temperature sensor 24 is not communicating wirelessly with the control module 22. Additionally, the control module 22 may determine that the outdoor-air-temperature sensor 24 is malfunctioning if the outdoor-air-temperature indicated by the outdoor-air-temperature sensor 24 is outside of a predetermined normal outdoor-air-temperature range. For example, if the outdoor-air-temperature indicated by the outdoor-air-temperature sensor 24 is 200 degrees Fahrenheit or greater, the control module 22 may determine that the outdoor-air-temperature sensor 24 is malfunctioning.

The method and control algorithm 1100 starts at 1102. At 1104, the control module 22 determines whether the outdoor-air-temperature sensor 24 is connected and communicating with the control module 22. For example, the outdoor-air-temperature sensor 24 may send a signal or communication packet at predetermined time intervals, such as every minute or every five or ten minutes. If the signal or communication packet is not received at the specified predetermine time interval or after a number of predetermined time intervals, such as two or three, for example, the control module 22 may determine that the outdoor-air-temperature sensor 24 is not connected and not communicating with the control module 22. Additionally or alternatively, the control module 22 may periodically send a ping signal or communication packet to the outdoor-air-temperature sensor 24 and wait for a response. If the response is not received from the outdoor-air-temperature sensor 24, the control module 22 may determine that the outdoor-air-temperature sensor 24 is not connected and not communicating with the control module. At 1104, when the control module 22 determines that the outdoor-air-temperature sensor 24 is connected and communicating, the control module 22 loops back to 1104 and continues to monitor communication with the outdoor-air-temperature sensor 24. At 1104, when the control module 22 determines that the outdoor-air-temperature sensor 24 is not connected and not communicating, the control module 22 proceeds to 1106.

At 1106, the control module 22 enters operation in a fault mode and generates an alert or notification indicating that the outdoor-air-temperature sensor 24 is not connected and/or not communicating. For example, the fault mode may include a predetermined default operating stage for the compressor. For example, the predetermined default operating stage may be a low-stage or a high-stage of a two-step compressor. Alternatively, the predetermined default operating stage may be a designated stage or capacity level of a multistep compressor. Alternatively, the predetermined default operating stage may be a designated stage or capacity level of a variable speed compressor. In this way, when the control module 22 receives a request for heating or cooling from the thermostat 26, the control module 22 may simply operate in the predetermined default operating stage until the request for heating or cooling has been satisfied.

Additionally or alternatively, the fault mode may include alternating between different compressor capacities. For example, the fault mode may include alternating between the low-stage and the high-stage of a two-step compressor. For example, the compressor may be operated for a first predetermined time period, such as fifteen minutes, in the low-stage, and then operated for a second predetermined time period, such as fifteen minutes, in the high-stage. In this way, the low-stage, with lower compressor capacity, may utilize lower compressor power, but may also provide a lower dehumidification capacity. By switching to the high stage after a predetermined time period, the climate-control system may be switched to a higher cooling capacity mode with a higher dehumidification. Conversely, running in the high-stage for a longer time at low ambient conditions may lead to evaporator coil freeze up and eventual loss of cooling capacity. By switching from the high-stage to the low-stage, evaporator coil freeze up may be avoided.

Additionally or alternatively, when the control module 22 determines that the outdoor-air-temperature sensor 24 is not connected and/or not communicating, the control module 22 may receive and use local, hourly weather data obtained directly from an online weather data source and/or through a wifi enabled thermostat. In such case, the control module 22 may continue to control the capacity of the compressor 12 by controlling the variable-capacity compressor in the fault mode based on the received local, hourly weather data.

The control module 22 may also generate an alert or notification using any of the methods described above for indicating, displaying, and/or communicating the current operating mode or stage of the compressor 12 or climate-control system 10. For example, the control module 22 may include a graphical display, such as LEDs, and may flash a specified sequence with the LEDs indicating that the climate-control system 10 is operating in a fault mode. Additionally or alternatively, the control module 22 may generate an alert or notification to be sent to the thermostat 26. In such case, the thermostat 26 may include graphical display for indicating that the climate-control system 10 is operating in a fault mode. Additionally or alternatively, when the thermostat 26 is a Wi-Fi enabled thermostat 26, the control module 22 may generate an alert or notification that can be communicated through the Wi-Fi enabled thermostat 26 and an associated server to a thermostat control application associated with the thermostat 26. Additionally or alternatively, the control module 22 may generate an alert or notification to be sent to a system controller or sub-controller for the climate-control system 10. Additionally or alternatively, the control module 22 may generate an alert or notification to be sent to a building automation system and/or a building automation system controller for the building associated with the climate-control system 10. After entering the fault mode and generating the alert or notification, the control module 22 proceeds to 1108.

At 1108, the control module 22 determines whether the outdoor-air-temperature sensor 24 has been reconnected and whether communication has been reestablished with the outdoor-air-temperature sensor 24. At 1108, when the outdoor-air-temperature sensor 24 has not been reconnected and communication with the outdoor-air-temperature sensor 24 has not been reestablished, the control module 22 loops back to 1108 and continues to monitor whether the outdoor-air-temperature sensor 24 has been reconnected and whether communication has been reestablished with the outdoor-air-temperature sensor 24. At 1108, when the control module 22 determines that the outdoor-air-temperature sensor 24 has been reconnected and communication has been reestablished with the outdoor-air-temperature sensor 24, the control module 22 proceeds to 1110.

At 1110, the control module 22 exits the fault mode of operation and returns to the normal operating mode. At 1110, the control module 22 also generates an alert or notification, in the same manner or manners described above with respect to step 1106, to indicate that the fault mode has been exited and that the climate-control system 10 is returning to the normal operating mode. The control module 22 then loops back to step 1104 and continues to monitor communication with the outdoor-air-temperature sensor 24.

In this way, the method and control algorithm 1100 ensures that the homeowner and/or building occupants do not feel uncomfortable in the event communication with the outdoor-air-temperature sensor 24 is disrupted. Further, the method and control algorithm 1100 also ensures that the climate-control system 10 does not remain stuck in an incorrect mode of operation, resulting in prolonged run time or discomfort for the homeowner and/or building occupants.

Figure 12:
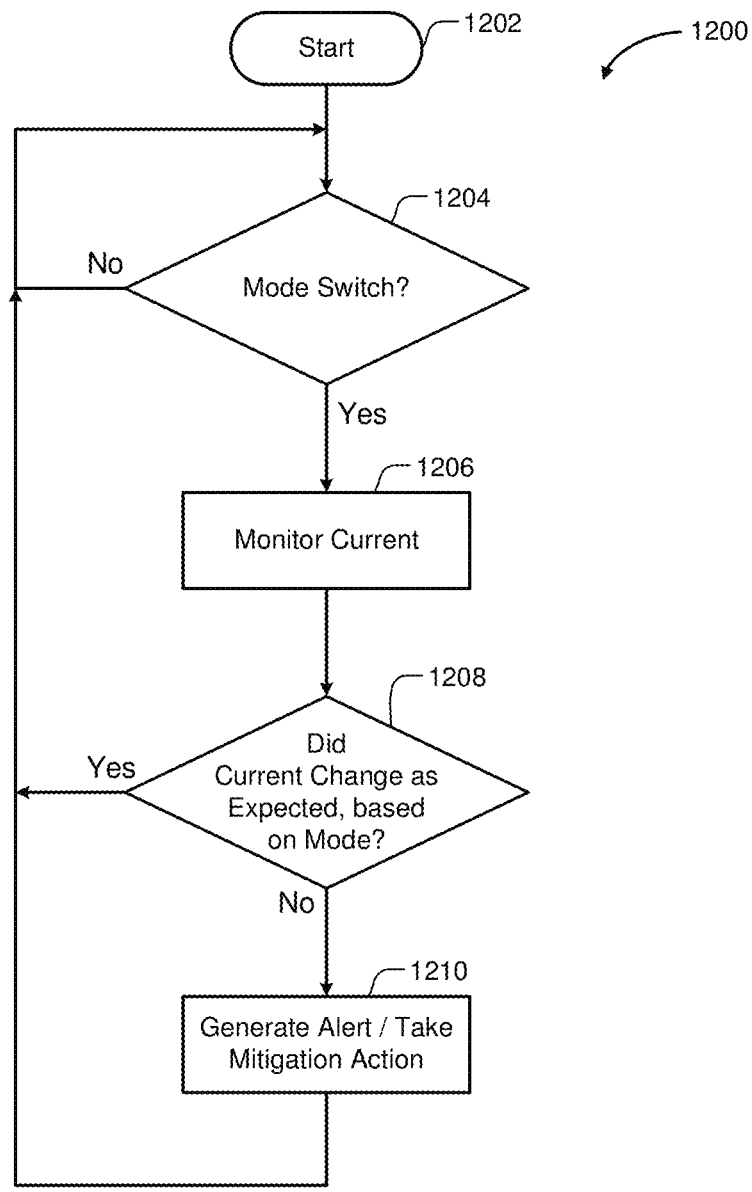
FIG. 12 is a flow chart illustrating another diagnostics algorithm for a variable-capacity compressor according to the principles of the present disclosure.

Referring now to FIG. 12, a method and control algorithm 1200 will be described that can be executed by the control module 22 for detecting whether the compressor 12 is operating as expected based on the applicable method and algorithm for compressor staging and control, as described above with reference, for example, to FIGS. 1-10. For example, the method and control algorithm 1200 can determine whether the compressor 12 is not changing modes or stages as expected and can generate an alert and/or take action to mitigate or remedy the issue.

The method and control algorithm 1200 starts at 1202. At 1204, the control module 22 determines whether a mode switch in compressor operation or staging should have occurred, based on the applicable method and algorithm for compressor staging and control and the current operating parameters, such as outdoor-ambient temperature (OAT), the predetermined low-capacity runtime T1, the previous high-capacity runtime T2, the OAT slope, etc., as described above. At 1204, when the control module 22 determines that the compressor 12 should be continuing operation in its current state, the control module 22 loops back to 1204 and continues to monitor the applicable operating parameters and execute the applicable method and algorithm for compressor staging and control.

At 1204, when the control module 22 determines that a change in mode of the operation of the compressor 12 should have occurred, the control module 22 proceeds to 1206. For example, the control module 22 can determine, based on monitoring the applicable operating parameters and the applicable method and algorithm for compressor staging and control, that the compressor 12 should have switched from a low-capacity operating stage to a high-capacity operating stage or from a high-capacity operating stage to a low-capacity operating stage.

At 1206, the control module 22 monitors the electrical current being delivered to the compressor 12 with a current sensor. Additionally or alternatively, the control module 22 may monitor electrical power consumption of the compressor 12 with a power meter.

At 1208, the control module 22 determines whether there was an expected change in the electrical current being delivered to the compressor 12, based on the anticipated change in mode of the compressor 12. For example, when the compressor 12 changes from a low-capacity operating stage to a high-capacity operating stage, the electrical current being delivered to the compressor 12 should increase. Similarly, when the compressor changes from a high-capacity operating stage to a low capacity operating stage, the electrical current being delivered to the compressor 12 should decrease. The magnitude of the expected change in electrical current being delivered to the compressor 12 may be predetermined based on the specific model of compressor 12 and the particular climate-control system 10. At 1208, when the control module 22 determines that the electrical current being delivered to the compressor 12 changed as expected, based on the applicable change in operating mode of the compressor 12, the control module 22 loops back to 1204 and continues to monitor any operating mode switches of the compressor 12.

At 1208, when the electrical current being delivered to the compressor 12 did not change as expected, based on the applicable change in operating mode of the compressor 12, the control module 22 proceeds to 1210 and generates an alert and/or takes action to mitigate the lack of mode change. Additionally or alternatively, the control module 22 may wait until the compressor 12 has failed to make an expected mode change a predetermined number of times before generating an alert and/or taking action to mitigate the lack of mode change. For example, the control module 22 may wait until the compressor 12 has failed to make an expected mode change two, three, or four consecutive times before generating an alert and/or taking action to mitigate the lack of mode change.

Additionally or alternatively, at 1208 the control module 22 may determine whether the compressor is stuck operating, for example, in a low-capacity operating stage or in a high-capacity operating stage based on the amount of electrical current being delivered to the compressor.

For example, at 1210 the control module 22 may enter into a fault mode, as described above, and may generate an alert or notification indicating that the compressor 12 is not changing modes as expected. For example, the control module 22 may generate an alert or notification using any of the methods described above for indicating, displaying, and/or communicating that the compressor 12 is not changing modes as expected and/or that the system is now operating in a fault mode. For example, the control module 22 may include a graphical display, such as LEDs, and may flash a specified sequence with the LEDs indicating that the compressor 12 is not changing modes as expected and that the climate-control system 10 is operating in a fault mode. Additionally or alternatively, the control module 22 may generate an alert or notification to be sent to the thermostat 26. In such case, the thermostat 26 may include graphical display for indicating that the compressor is not changing modes as expected and/or that the climate-control system 10 is operating in a fault mode. Additionally or alternatively, when the thermostat 26 is a Wi-Fi enabled thermostat 26, the control module 22 may generate an alert or notification that can be communicated through the Wi-Fi enabled thermostat 26 and an associated server to a thermostat control application associated with the thermostat 26. Additionally or alternatively, the control module 22 may generate an alert or notification to be sent to a system controller or sub-controller for the climate-control system 10. Additionally or alternatively, the control module 22 may generate an alert or notification to be sent to a building automation system and/or a building automation system controller for the building associated with the climate-control system 10.

The failure of the compressor 12 to change operating modes as expected may be due to a stuck compressor mode switch mechanism or device, such as a solenoid or contactor. In such case, the stuck compressor mode switch mechanism or device, and the resulting extended operation of the compressor 12 in only a single mode, can result in the evaporator coil freezing up. The control module 22 in such case, however, can alert a homeowner, building occupant, a contractor, and/or a monitoring service to the stuck compressor mode switch mechanism or device so that appropriate maintenance actions can be taken.

Under milder ambient temperatures, such as less than 75 to 80 degrees Fahrenheit, and/or where the cooling load is low, when the compressor 12 runs for an extended period of time in a high-capacity stage for a two-step compressor system or one of the higher capacity stages for a multi-step compressor system, the evaporator temperature may approach freezing temperatures. In such case, the condensate on the evaporator can freeze to a point where the entire coil or a portion of the coil is frozen and air may not be able to pass through the coil. The layer of ice may impede heat transfer to a point where refrigerant inside the evaporator tubes cannot transfer enough to evaporate, thereby substantially reducing the system's cooling capacity and potentially damaging the compressor if liquid enters the compressor 12. This phenomenon may not occur with higher ambient temperatures or higher cooling loads as the temperature of air returning to the evaporator may be higher. However, with a lower cooling load, the return air from the conditioned space may be at a lower temperature.

The control module 22 in such a situation can alert the homeowner, building owner, residential AC/Heat pump system owner, etc. by alerting the user of the potential malfunction of the mode switch mechanism or device, of the current fault mode operation of the compressor, and/or of the potential for evaporator coil freeze up.

In addition, the control module 22 may take mitigation action to help prevent evaporator coil freeze up. In particular, the control module 22 may cycle the compressor 12 after a predetermined amount of time. For example, after every twenty minutes of runtime, the control module 22 may cycle the compressor 12 off for 5 minutes if the outdoor-ambient temperature is within a predetermined mild temperature range. While the compressor 12 is off, the indoor fan may remain on to continue to blow air over the evaporator coil. In addition, the control module 22 may leave the compressor 12 off until a demand for cooling or heating is made. Additionally or alternatively, if a variable speed fan is used, the fan speed of the evaporator fan may be increased to increase the volume air being blown over the evaporator coil.

Additionally or alternatively, at 1210 if the control module 22 has determined that the compressor is stuck operating, for example, in the low-capacity operating stage or in the high-capacity operating stage based on the amount of electrical current being delivered to the compressor, the control module 22 may take different mitigating actions based on which capacity mode the compressor 12 is stuck operating in. Alternatively, the control module 22 may not take any mitigating actions when the compressor 12 is stuck in the low-capacity operating stage.

For example, if the compressor 12 is stuck operating in the low-capacity operating stage, the mitigating action or fault mode may include reducing the indoor blower fan speed to enhance dehumidification capacity of the unit. The lowering of the indoor blower fan speed may also be performed on an alternating basis, in other words after a predetermined run time, when the compressor 12 is stuck in the low-capacity operating stage, the indoor blower air flow rate may be reduced for a predetermined time period, followed by increasing the indoor blower fan speed to the original air flow rate for another predetermined run time, etc.

For example, if the compressor 12 is stuck operating in the high-capacity operating stage, the mitigating action or fault mode may include cycling the system off for a predetermined amount of time, for example fifteen minutes, after a predetermined run time, for example forty minutes, in the high-capacity operating stage when the ambient temperature is lower than a cut-off value. By operating in this fashion, a potential situation where the indoor coil may freeze up due to extended operation in the high-capacity operating stage in low ambient conditions is avoided. While the compressor is stuck in operation at a single capacity level, and cannot switch between the low and high capacity operating stages, the control module 22 is able to monitor ambient temperature data that can be utilized to avoid a potential coil freeze up and eventual loss of cooling capacity.

Figure 13:
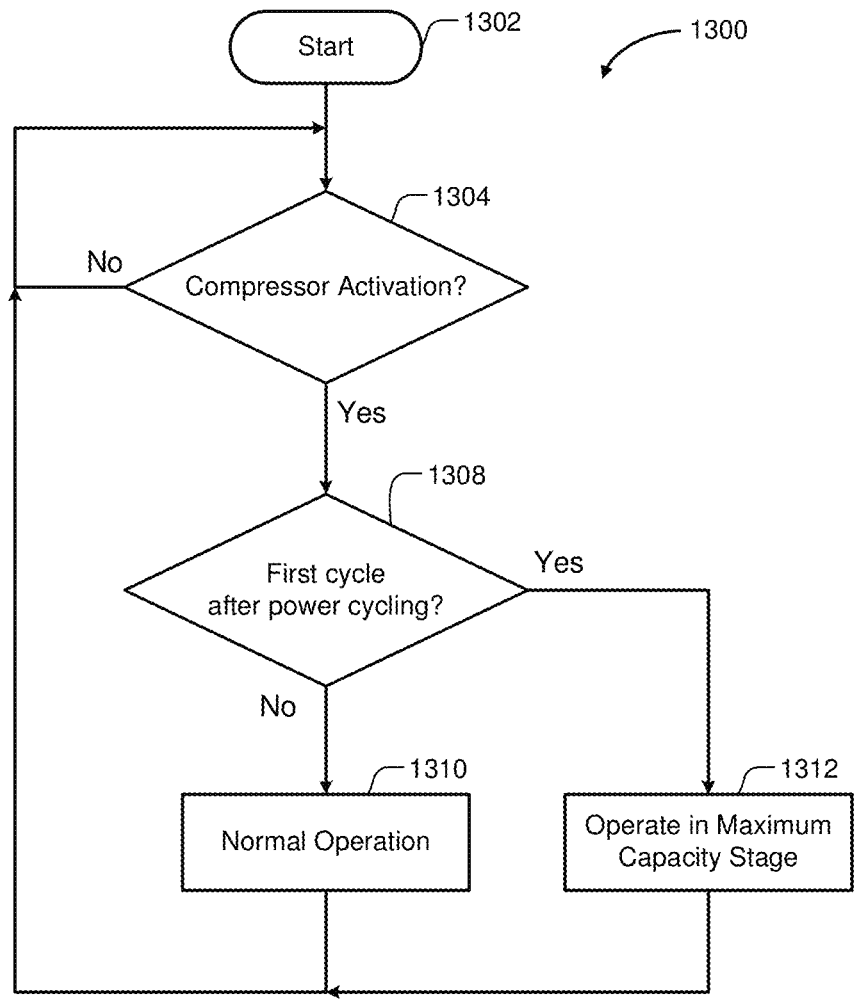
FIG. 13 is a flow chart illustrating a control algorithm for a variable-capacity compressor according to the principles of the present disclosure.

Referring now to FIG. 13, a method and control algorithm 1300 will be described that can be executed by the control module 22 for assisting a contractor when charging the climate-control system 10 with refrigerant.

When a contractor charges a climate-control system 10 with refrigerant, it is important for a climate-control system 10 with a multi-stage compressor to be operated in a high-capacity stage after charging the climate-control system 10 with refrigerant. In existing systems, the contractor may not know whether the compressor 12 of the climate-control system 10 is being operated in a high- or low-capacity stage and may simply turn the thermostat as low as possible and hope that the climate-control system 10 will be operated in the high-capacity stage. Alternatively, in an existing system, the contractor may use an amp-clamp to determine the amount of electrical current being delivered to the compressor and, from the level of electrical current, determine whether the compressor is being operated in a high- or low-capacity stage.

With the method and control algorithm 1330 of FIG. 13, the compressor 12 is always operated at maximum capacity in the first cycle after power cycling of the compressor 12. In this way, the contractor can simply cycle power to the compressor 12 off and then back on to ensure that the compressor 12 will operate in the high-capacity stage. The method and control algorithm 1300 starts at 1302.

At 1304, the control module 22 determines whether there has been a command for compressor activation. At 1304, when there has not been a command for compressor activation, the control module 22 loops back to 1304 and continues to monitor whether there has been a command for compressor activation. At 1304, when there has been a command for compressor activation, the control module 22 proceeds to 1308.

At 1308, the control module 22 determines whether the current compressor activation will be the first cycle after a power cycling. In other words, the control module 22 may determine whether this will be the first time the compressor 12 has been activated since the last cycling of power to the compressor. A power cycling may occur, for example, if power to the compressor was disconnected and then reconnected by cycling a power switch of the compressor or a circuit breaker switch associated with the compressor. The compressor 12 and/or the control module 22 may have a memory flag that is reset each time power to the compressor is cycled. In such case, the control module 22 may monitor the memory flag to determine whether the current compressor activation will be the first activation since the last power cycle.

At 1308, when the current compressor activation will not be the first activation since the last power cycle, the control module 22 loops back to 1304 and continues to monitor cycling commands.

At 1308, when the current compressor activation will be the first activation since the last power cycle, the control module 22 proceeds to 1312 and operates the compressor in the maximum capacity stage available for a predetermined time period, such as ten or fifteen minutes. In addition, the control module 22 may provide a graphical indication of the current stage of the compressor 12, as discussed in detail above. In this way, the contractor may be able to confirm that the compressor 12 is operating in the maximum capacity stage available by reviewing the graphical indication of the current stage of the compressor 12.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
    a variable-capacity compressor operable at a first capacity and at a second capacity that is higher than the first capacity;
    an outdoor-air-temperature sensor that generates outdoor-air-temperature data corresponding to an outdoor-air temperature;
    a control module that receives a demand signal from a thermostat, that determines whether communication with the outdoor-air-temperature sensor has been interrupted, and that operates the variable-capacity compressor in a first mode in response to determining that communication with the outdoor-air-temperature sensor has not been interrupted and in a fault mode in response to determining that at least one of communication with the outdoor-air-temperature sensor has been interrupted and the outdoor-air-temperature indicated by the outdoor-air-temperature data is outside of a predetermined temperature range;
    wherein the control module operates the variable-capacity compressor in the first mode by switching the variable-capacity compressor between the first capacity and the second capacity based on the demand signal and the outdoor-air-temperature data and operates the variable-capacity compressor in the fault mode by operating the variable-capacity compressor at at least one of the first capacity and the second capacity based on the demand signal.

2. The system of claim 1, wherein the fault mode includes operating the variable-capacity compressor at only the first capacity.

3. The system of claim 1, wherein the fault mode includes operating the variable-capacity compressor at only the second capacity.

4. The system of claim 1, wherein the fault mode includes operating the variable-capacity compressor at the first capacity for a first predetermined time period and operating the variable-capacity compressor at the second capacity for a second predetermined time period.

5. The system of claim 1, wherein the control module generates an alert in response to determining that communication with the outdoor-air-temperature sensor has been interrupted and the variable-capacity compressor is operating in the fault mode.

6. The system of claim 5, wherein the control module outputs the alert to at least one of: a graphical display on the control module indicating that the variable-capacity compressor is operating in the fault mode; the thermostat to display that the variable-capacity compressor is operating in the fault mode; a system controller for a climate-control system that includes the variable-capacity compressor; and a sub-controller for a climate-control system that includes the variable-capacity compressor.

7. The system of claim 1, wherein the control module receives and uses local, hourly weather data obtained directly from at least one of an online weather data source and a wifi enabled thermostat when controlling the variable-capacity compressor in the fault mode.

8. The system of claim 1, wherein when controlling the variable-capacity compressor in the fault mode, the control module switches to the first mode and follows predetermined run-times for operating the variable-capacity compressor at the first and second capacities based on the outdoor-air-temperature data in response to at least one of determining that communication with the outdoor-air-temperature sensor has been reestablished and determining that the outdoor-air-temperature indicated by the outdoor-air-temperature data is within the predetermined temperature range.

9. A method comprising:
receiving, with a control module, a demand signal from a thermostat;
determining, with the control module, that at least one of communication with an outdoor-air-temperature sensor that generates outdoor-air-temperature data corresponding to an outdoor-air temperature has been interrupted and the outdoor-air-temperature indicated by the outdoor-air-temperature data is outside of a predetermined temperature range;
operating, with the control module, a variable-capacity compressor operable at a first capacity and at a second capacity that is higher than the first capacity, the control module operating the variable-capacity compressor in a first mode in response to determining that there is communication with the outdoor-air-temperature sensor and the control module and that the outdoor-air-temperature indicated by the outdoor-air-temperature data is within the predetermined range, the control module operating the variable-capacity compressor in a fault mode in response to determining that at least one of communication with the outdoor-air-temperature sensor has been interrupted and that the outdoor-air-temperature indicated by the outdoor-air-temperature data is outside of the predetermined temperature range;
wherein the control module operates the variable-capacity compressor in the first mode by switching the variable-capacity compressor between the first capacity and the second capacity based on the demand signal and the outdoor-air-temperature data and operates the variable-capacity compressor in the fault mode by operating the variable-capacity compressor at one of the first capacity and the second capacity based on the demand signal.

10. The method of claim 9, wherein the fault mode includes operating the variable-capacity compressor at only the first capacity.

11. The method of claim 9, wherein the fault mode includes operating the variable-capacity compressor at only the second capacity.

12. The method of claim 9, wherein the fault mode includes operating the variable-capacity compressor at the first capacity for a first predetermined time period and operating the variable-capacity compressor at the second capacity for a second predetermined time period.

13. The method of claim 9, further comprising generating, with the control module, an alert in response to determining that communication with the outdoor-air-temperature sensor has been interrupted and the variable-capacity compressor is operating in the fault mode.

14. The method of claim 13, the method further comprising outputting, with the control module, the alert to at least one of: a graphical display on the control module indicating that the variable-capacity compressor is operating in the fault mode; the thermostat to display that the variable-capacity compressor is operating in the fault mode; a system controller for a climate-control system that includes the variable-capacity compressor; and a sub-controller for the climate-control system that includes the variable-capacity compressor.

15. The method of claim 9, further comprising receiving and using, with the control module, local, hourly weather data obtained directly from at least one of an online weather data source and a wifi enabled thermostat when controlling the variable-capacity compressor in the fault mode.

16. The method of claim 9, wherein when controlling the variable-capacity compressor in the fault mode, the control module switches to the first mode and follows predetermined run-times for operating the variable-capacity compressor at the first and second capacities based on the outdoor-air-temperature data in response to at least one of determining that communication with the outdoor-air-temperature sensor has been reestablished and determining that the outdoor-air-temperature indicated by the outdoor-air-temperature data is within the predetermined temperature range.

17. A system comprising:
a variable-capacity compressor operable at a first capacity and at a second capacity that is higher than the first capacity;
an outdoor-air-temperature sensor that generates outdoor-air-temperature data corresponding to an outdoor-air temperature;
a current sensor that generates electrical current data corresponding to electrical current delivered to the compressor;
a control module that receives a demand signal from a thermostat, the outdoor-air-temperature data, and the electrical current data, that switches the variable-capacity compressor between the first capacity and the second capacity based on the outdoor-air-temperature data and the demand signal, and that determines whether the electrical current data indicates an expected change in the electrical current being delivered to the compressor when the variable-capacity compressor is switched between the first capacity and the second capacity;
wherein, in response to determining that the electrical current data does not indicate the expected change in the electrical current being delivered to the compressor when the variable-capacity compressor is switched between the first capacity and the second capacity, the control module performs at least one of operating the variable-capacity compressor in a fault mode, generating an alert indicating that the variable-capacity compressor is operating in the fault mode, and mitigating actions.

18. The system of claim 17, wherein the current sensor measures the electrical current delivered to an outdoor condensing unit that includes the variable-capacity compressor.

19. The system of claim 17, wherein the control module operates the variable-capacity compressor in the fault mode, in response to determining that the electrical current data does not indicate the expected change in the electrical current being delivered to the compressor when the variable-capacity compressor is switched between the first capacity mode and the second capacity mode, and wherein the control module determines whether the variable-capacity compressor is stuck operating at the first capacity or at the second capacity.

20. The system of claim 17, wherein the control module generates the alert in response to determining that the electrical current data does not indicate the expected change in the electrical current being delivered to the compressor when the variable-capacity compressor is switched between the first capacity and the second capacity, and wherein the control module outputs the alert to at least one of: a graphical display on the control module indicating that the variable-capacity compressor is operating in the fault mode; the thermostat to indicate that the variable-capacity compressor is operating in the fault mode; a system controller for a climate-control system that includes the variable-capacity compressor; and a sub-controller for the climate-control system that includes the variable-capacity compressor.

21. The system of claim 17, wherein the control module performs mitigating actions in response to determining that the electrical current data does not indicate the expected change in the electrical current being delivered to the compressor when the variable-capacity compressor is switched between the first capacity and the second capacity, the mitigating actions including at least one of: cycling the variable-capacity compressor after a predetermined time period in response to the outdoor-air temperature being within a predetermined temperature range; operating an indoor fan to blow air over an evaporator coil connected to the variable-capacity compressor; and increasing a fan speed of the indoor fan to blow over the evaporator coil connected to the variable-capacity compressor.

22. The system of claim 21, wherein the control module determines whether the variable-capacity compressor is stuck operating at the first capacity or at the second capacity and determines the mitigating actions to be performed based on whether the variable-capacity compressor is stuck operating at the first capacity or at the second capacity.

23. A method comprising:
generating, with an outdoor-air-temperature sensor, outdoor-air-temperature data corresponding to an outdoor-air temperature;
generating, with a current sensor, electrical current data corresponding to electrical current delivered to the compressor;
receiving, with a control module, the outdoor-air-temperature data, the electrical current data, and a demand signal from a thermostat;
switching, with the control module, a variable-capacity compressor between operation in a first capacity and a second capacity that is higher than the first capacity based on the outdoor-air-temperature data and the demand signal;
determining, with the control module, whether the electrical current data indicates an expected change in the electrical current being delivered to the compressor when the variable-capacity compressor is switched between the first capacity mode and the second capacity mode;
performing, with the control module, at least one of operating the variable-capacity compressor in a fault mode, generating an alert indicating that the variable-capacity compressor is operating in the fault mode, and mitigating actions in response to determining that the electrical current data does not indicate the expected change in the electrical current being delivered to the compressor when the variable-capacity compressor is switched between the first capacity and the second capacity.

24. The method of claim 23, wherein the current sensor measures the electrical current delivered to an outdoor condensing unit that includes the variable-capacity compressor.

25. The method of claim 23, wherein the control module operates the variable-capacity compressor in the fault mode, in response to determining that the electrical current data does not indicate the expected change in the electrical current being delivered to the compressor when the variable-capacity compressor is switched between the first capacity mode and the second capacity mode, and wherein the control module determines whether the variable-capacity compressor is stuck operating at the first capacity or at the second capacity.

26. The method of claim 23, wherein the control module generates the alert in response to determining that the electrical current data does not indicate the expected change in the electrical current being delivered to the compressor when the variable-capacity compressor is switched between the first capacity mode and the second capacity mode, the method further comprising outputting, with the control module, the alert to at least one of a graphical display on the control module indicating that the variable-capacity compressor is operating in the fault mode; the thermostat indicating that the variable-capacity compressor is operating in the fault mode; a system controller for a climate-control system that includes the variable-capacity compressor; and a sub-controller for the climate-control system that includes the variable-capacity compressor.

27. The method of claim 23, wherein the control module performs mitigating actions in response to determining that the electrical current data does not indicate the expected change in the electrical current being delivered to the compressor when the variable-capacity compressor is switched between the first capacity and the second capacity, the mitigating actions including at least one of: cycling the variable-capacity compressor after a predetermined time period in response to the outdoor-air temperature being within a predetermined temperature range; operating an indoor fan to blow air over an evaporator coil connected to the variable-capacity compressor; and increasing a fan speed of the indoor fan to blow over the evaporator coil connected to the variable-capacity compressor.

28. The method of claim 27, wherein the control module determines whether the variable-capacity compressor is stuck operating at the first capacity or at the second capacity and determines the mitigating actions to be performed based on whether the variable-capacity compressor is stuck operating at the first capacity or at the second capacity.

29. A system comprising:
a variable-capacity compressor operable at a first capacity and at a second capacity that is higher than the first capacity;
an outdoor-air-temperature sensor that generates outdoor-air-temperature data corresponding to an outdoor-air temperature;
a control module that receives a demand signal from a thermostat, that determines whether the variable-capacity compressor has been activated since a most recent power cycling of the variable-capacity compressor in response to receiving the demand signal, that operates the variable-capacity compressor at the second capacity for at least a predetermined time period in response to determining that the variable-capacity compressor has not been activated since the most recent power cycling of the variable-capacity compressor, and that switches the variable-capacity compressor between the first capacity and the second capacity based on the demand signal and the current outdoor air temperature in response to determining that the variable-capacity compressor has been activated since the most recent power cycling of the variable-capacity compressor.

30. The system of claim 29, further comprising a current sensor that generates electrical current data corresponding to electrical current delivered to the compressor, wherein the control module verifies that the variable-capacity compressor is operating at the second capacity in response to determining that the variable-capacity compressor has not been activated since the most recent power cycling of the variable-capacity compressor based on the electrical current data and outputs an alert indicating that the control module verifies that the variable-capacity compressor is operating at the second capacity.

31. A method comprising:
generating, with an outdoor-air-temperature sensor, outdoor-air-temperature data corresponding to an outdoor-air temperature;
receiving, with a control module, a demand signal from a thermostat;
determining, with the control module, whether a variable-capacity compressor, that is operable at a first capacity and at a second capacity that is higher than the first capacity, has been activated since a most recent power cycling of the variable-capacity compressor in response to receiving the demand signal;
operating, with the control module, the variable-capacity compressor at the second capacity for at least a predetermined time period in response to determining that the variable-capacity compressor has not been activated since the most recent power cycling of the variable-capacity compressor;
switching, with the control module, the variable-capacity compressor between the first capacity and the second capacity based on the demand signal and the current outdoor air temperature in response to determining that the variable-capacity compressor has been activated since the most recent power cycling of the variable-capacity compressor.

32. The method of claim 31, further comprising:
generating, with a current sensor, electrical current data corresponding to electrical current delivered to the compressor;
verifying, with the control module, that the variable-capacity compressor is operating at the second capacity in response to determining that the variable-capacity compressor has not been activated since the most recent power cycling of the variable-capacity compressor based on the electrical current data;
outputting, with the control module, an alert indicating that the control module verifies that the variable-capacity compressor is operating at the second capacity.

* * * * *